(12) United States Patent
Wagner et al.

(10) Patent No.: US 10,910,615 B2
(45) Date of Patent: Feb. 2, 2021

(54) MOUNTING SOLUTIONS FOR ELECTRIFIED VEHICLE BATTERY PACKS

(71) Applicant: FORD GLOBAL TECHNOLOGIES, LLC, Dearborn, MI (US)

(72) Inventors: Thomas A. Wagner, Ann Arbor, MI (US); Jingmei Shen, Troy, MI (US); Amar Marpu, Canton, MI (US); Ihab Grace, Grosse Pointe Woods, MI (US); Nicholas Braeseker, Novi, MI (US); Ahteram Khan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 273 days.

(21) Appl. No.: 16/042,079

(22) Filed: Jul. 23, 2018

(65) Prior Publication Data
US 2020/0028136 A1    Jan. 23, 2020

(51) Int. Cl.
*H01M 2/10*     (2006.01)
*B60K 1/04*     (2019.01)
*B60K 6/28*     (2007.10)
*B60L 50/64*    (2019.01)

(52) U.S. Cl.
CPC ............ *H01M 2/1083* (2013.01); *B60K 1/04* (2013.01); *B60K 6/28* (2013.01); *B60L 50/64* (2019.02); *H01M 2/1077* (2013.01); *B60K 2001/0416* (2013.01); *B60Y 2200/91* (2013.01); *B60Y 2200/92* (2013.01); *B60Y 2400/112* (2013.01); *H01M 2220/20* (2013.01)

(58) Field of Classification Search
CPC ... H01M 2/1077; H01M 2/1083; B60L 50/64; B60L 50/66; B60K 1/04
See application file for complete search history.

(56) References Cited

U.S. PATENT DOCUMENTS

| | | | |
|---|---|---|---|
| 7,507,499 B2 | 3/2009 | Zhou et al. | |
| 7,997,368 B2 | 8/2011 | Takasaki et al. | |
| 8,276,696 B2 | 10/2012 | Lucas | |
| 8,967,312 B2 | 3/2015 | Yanagi | |
| 9,608,245 B2 | 3/2017 | DeKeuster et al. | |
| 2012/0175177 A1 | 7/2012 | Lee et al. | |
| 2013/0252059 A1 | 9/2013 | Choi et al. | |
| 2017/0338454 A1 | 11/2017 | Millon | |
| 2018/0083239 A1 | 3/2018 | Subramanian et al. | |
| 2019/0355948 A1* | 11/2019 | Smith | H01M 10/625 |

* cited by examiner

Primary Examiner — Stephan J Essex
(74) Attorney, Agent, or Firm — David B. Kelley; Carlson, Gaskey & Olds

(57) ABSTRACT

This disclosure details exemplary battery pack designs for use in electrified vehicles. Exemplary battery packs may include an enclosure assembly, one or more battery internal components (e.g., battery arrays, battery electronic components, or both) inside the enclosure assembly, and a structural brace outside of the enclosure assembly. The battery internal component may be mechanically coupled to the structural brace while also being mechanically decoupled from the enclosure assembly.

20 Claims, 4 Drawing Sheets

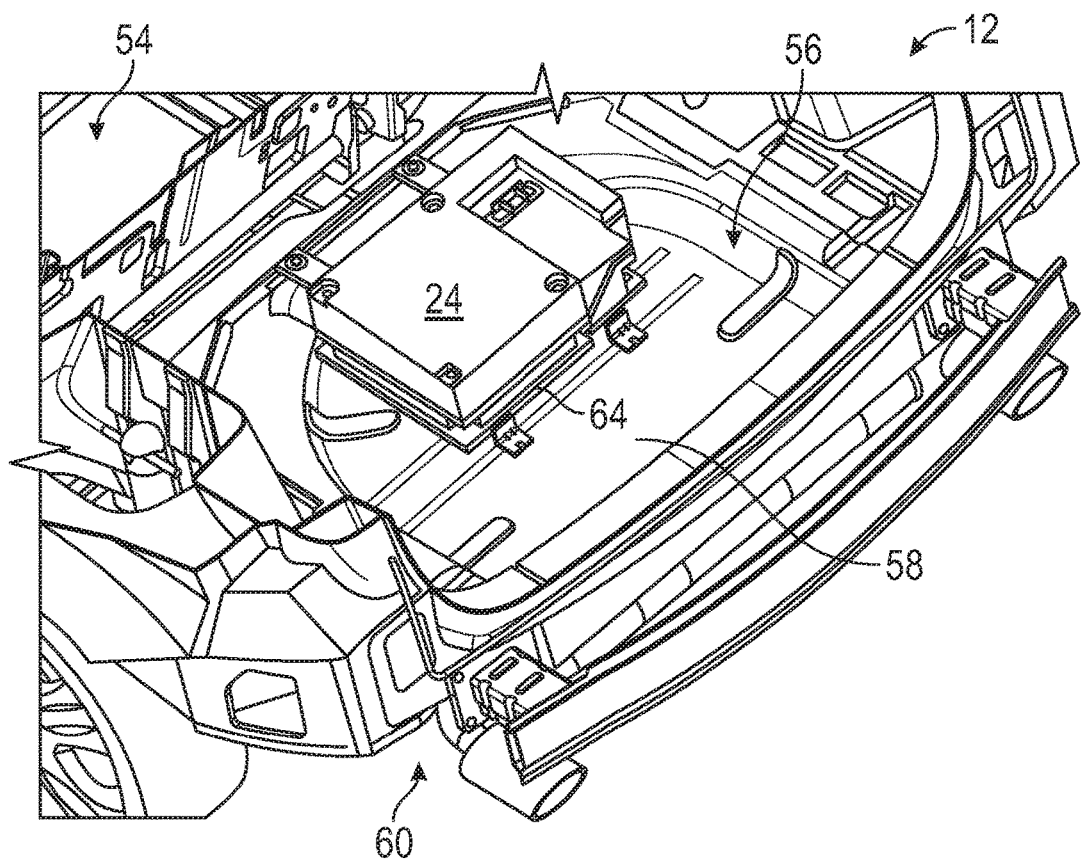
FIG. 2
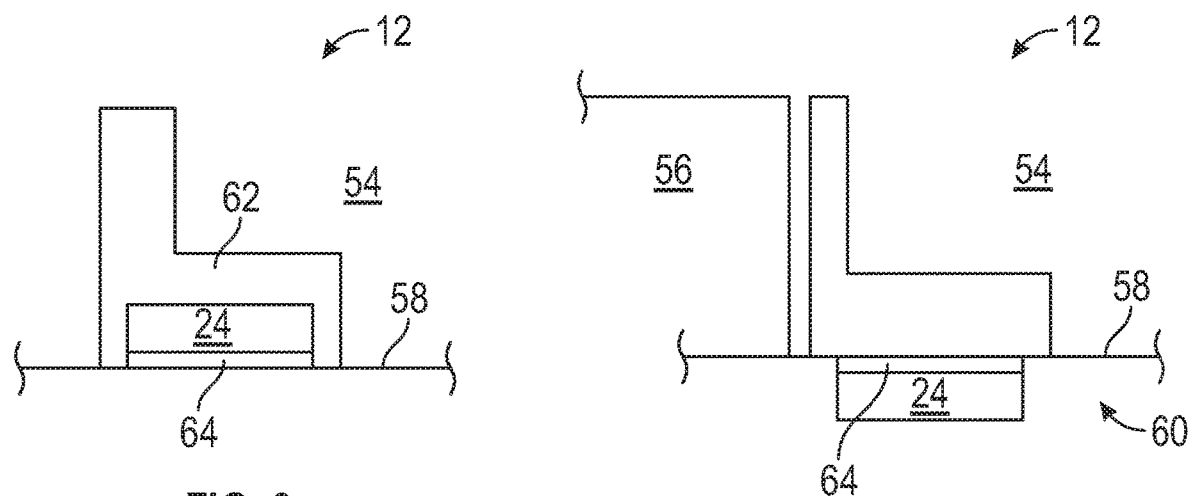
FIG. 3
FIG. 4

MOUNTING SOLUTIONS FOR ELECTRIFIED VEHICLE BATTERY PACKS

TECHNICAL FIELD

This disclosure relates to electrified vehicle battery packs, and more particularly to battery packs that include one or more battery internal components that are mechanically decoupled from surrounding enclosure assemblies of the battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery cells that store energy for powering these electrical loads. The enclosure assembly typically must transfer impact loads in response to vehicle impact and durability events.

SUMMARY

A battery pack according to an exemplary aspect of the present disclosure includes, among other things, an enclosure assembly, a battery internal component inside the enclosure assembly, and a structural brace outside the enclosure assembly. The battery internal component is mechanically coupled to the structural brace and is mechanically decoupled from the enclosure assembly.

In a further non-limiting embodiment of the foregoing battery pack, the enclosure assembly is a polymer-based component.

In a further non-limiting embodiment of either of the foregoing battery packs, the enclosure assembly includes a tray and a cover.

In a further non-limiting embodiment of any of the foregoing battery packs, the battery internal component includes a battery array.

In a further non-limiting embodiment of any of the foregoing battery packs, the battery internal component includes a battery electronic component.

In a further non-limiting embodiment of any of the foregoing battery packs, the battery internal component includes each of a battery array and a battery electronic component.

In a further non-limiting embodiment of any of the foregoing battery packs, the battery internal component is mechanically coupled to the structural brace by at least one fastener.

In a further non-limiting embodiment of any of the foregoing battery packs, the at least one fastener is a bolt or a screw.

In a further non-limiting embodiment of any of the foregoing battery packs, the structural brace includes a receiving component configured to fixedly accept the at least one fastener.

In a further non-limiting embodiment of any of the foregoing battery packs, the receiving component is a nut, a dowel, or a threaded opening.

In a further non-limiting embodiment of any of the foregoing battery packs, the structural brace is a single piece metallic mounting plate.

In a further non-limiting embodiment of any of the foregoing battery packs, the structural brace includes a first mounting plate and a second mounting plate that is separate from the first mounting plate.

In a further non-limiting embodiment of any of the foregoing battery packs, the battery internal component includes a battery array mounted to the first mounting plate and a battery electronic component mounted to the second mounting plate.

In a further non-limiting embodiment of any of the foregoing battery packs, the structural brace includes a metallic tubular member.

In a further non-limiting embodiment of any of the foregoing battery packs, the enclosure assembly includes a tray, and a floor of the tray extends between the battery internal component and the structural brace.

An electrified vehicle according to another exemplary aspect of the present disclosure includes, among other things, a vehicle body structure and a battery pack mounted to the vehicle body structure. The battery pack includes an enclosure assembly, a battery internal structure inside the enclosure assembly, and a structural brace outside of the enclosure assembly. The battery internal structure is mounted to the structural brace but not to the enclosure assembly.

In a further non-limiting embodiment of the foregoing electrified vehicle, the vehicle body structure is a floor pan.

In a further non-limiting embodiment of either of the foregoing electrified vehicles, the battery pack is mounted above the floor pan.

In a further non-limiting embodiment of any of the foregoing electrified vehicles, the battery pack is mounted below the floor pan.

In a further non-limiting embodiment of any of the foregoing electrified vehicles, the battery internal structure is a battery array, a battery electronic component, or both.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates a first exemplary mounting location of a battery pack of an electrified vehicle.

FIG. 3 illustrates a second exemplary mounting location of a battery pack of an electrified vehicle.

FIG. 4 illustrates a third exemplary mounting location of a battery pack of an electrified vehicle.

DETAILED DESCRIPTION

This disclosure details exemplary battery pack designs for use in electrified vehicles. Exemplary battery packs may include an enclosure assembly, one or more battery internal components (e.g., battery arrays, battery electronic components, or both) inside the enclosure assembly, and a structural brace outside of the enclosure assembly. The battery internal component may be mechanically coupled to the structural brace while also being mechanically decoupled from the enclosure assembly. The structural braces may enable cost and weight reductions through the use of polymer-based enclosure assemblies for housing the battery internal components without sacrificing impact protection. These and other features are discussed in greater detail in the following paragraphs of this detailed description.

Figure 1:
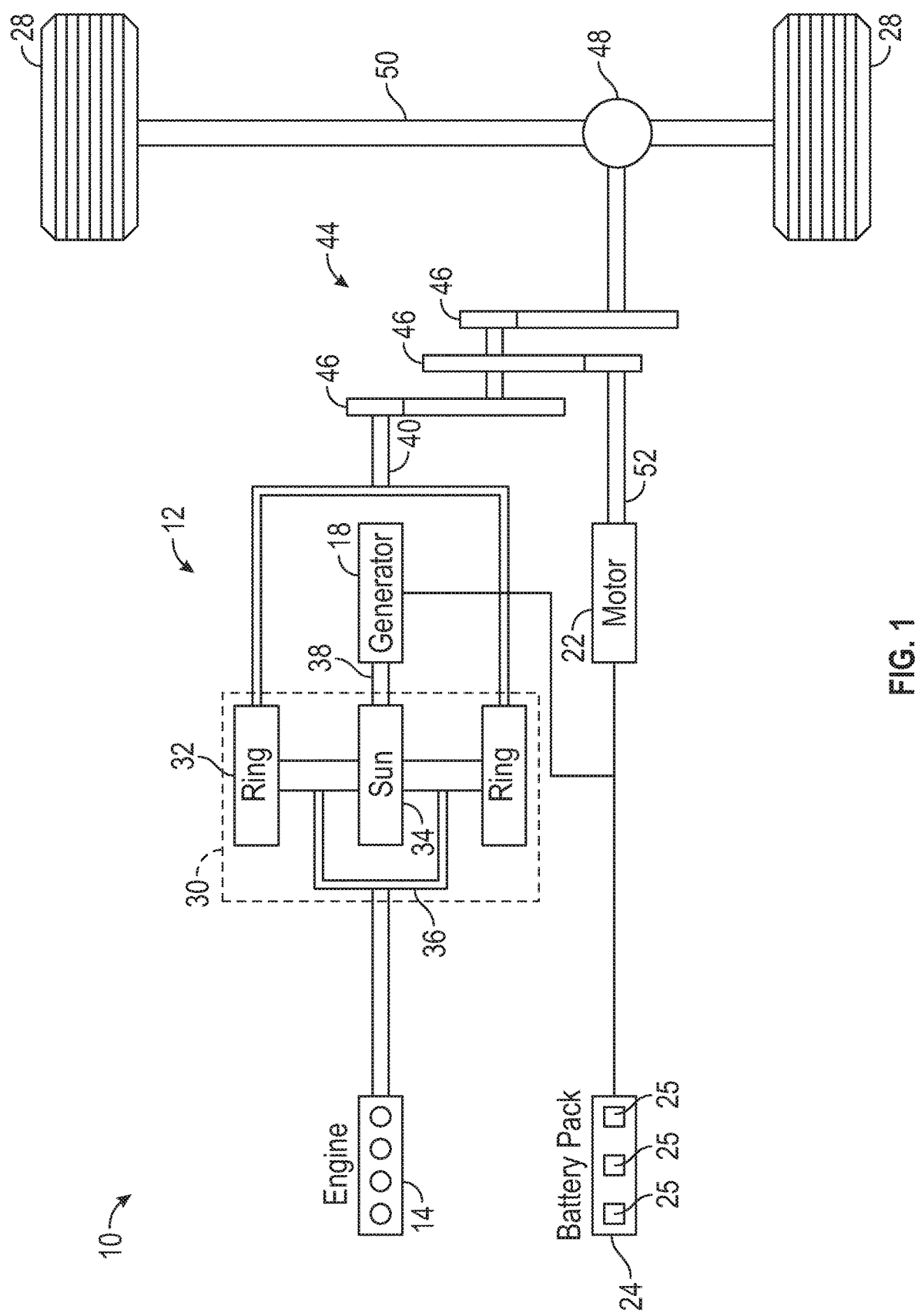
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

FIGS. 2-4 illustrate select portions of an electrified vehicle 12 that may employ the powertrain 10 of FIG. 1 or any other electrified or hybridized powertrain. In an embodiment, the electrified vehicle 12 is a car. However, the electrified vehicle 12 could be a car, a truck, a van, a sport utility vehicle, or any other vehicle type.

The battery pack 24 may be mounted at various locations of the electrified vehicle 12. The electrified vehicle 12 may include a passenger cabin 54 and a cargo space 56 (e.g., a trunk) located to the rear of the passenger cabin 54. In an embodiment, shown in FIG. 2, the battery pack 24 is mounted within the cargo space 56. The battery pack 24 may be mounted to a vehicle body structure 58, such as a floor pan, that generally separates the passenger cabin 54 and the cargo space 56 from a vehicle underbody 60.

In another embodiment, shown in FIG. 3, the battery pack 24 is mounted below a vehicle seat 62 at a location inside the passenger cabin 54. For example, the battery pack 24 may be mounted to the vehicle body structure 58. In such an embodiment, the battery pack 24 protrudes above the vehicle body structure 58.

In yet another embodiment, shown in FIG. 4, the battery pack 24 is suspended from the vehicle underbody 60 (i.e., below the vehicle body structure 58) and is thus outside of both the passenger cabin 54 and the cargo space 56. The battery pack 24 of the embodiment of FIG. 4 therefore does not occupy space that would otherwise be available for carrying passengers or cargo. The battery pack 24 may be secured relative to the vehicle body structure 58 using any fastening method, including but not limited to bolting, strapping, welding, etc.

In each of the embodiments shown in FIGS. 2-4, the battery pack 24 may include a structural brace 64. As discussed in greater detail below, the structural brace 64 may be utilized to mount the battery pack 24 to the vehicle body structure 58 and is designed to accept and transfer loading between the battery pack 24 and the vehicle body structure 58, such as during vehicle impact events (e.g., collisions, etc.).

Figure 5A:
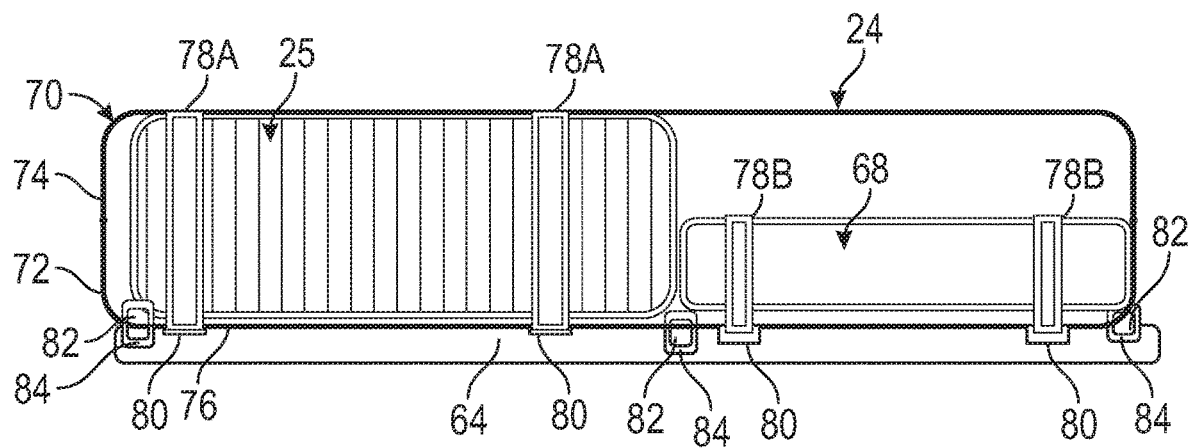
FIGS. 5A and 5B illustrate a battery pack that includes a structural brace according to a first embodiment of this disclosure.
Figure 5B:
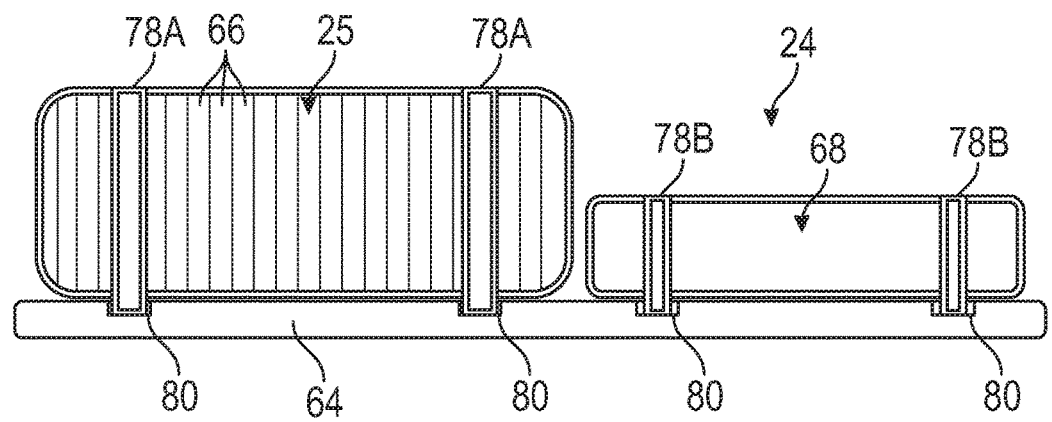

FIGS. 5A and 5B schematically illustrate a battery pack 24 that can be employed within an electrified vehicle. The battery pack 24 of FIGS. 5A and 5B is exemplary of any of the battery packs shown in FIGS. 1-4.

The battery pack 24 may house a plurality of battery cells 66 that store energy for powering various electrical loads of the electrified vehicle 12. The battery pack 24 could employ any number of battery cells 66 within the scope of this disclosure. Thus, this disclosure is not limited to the exact configuration shown in FIGS. 5A and 5B.

The battery cells 66 may be stacked side-by-side along an axis to construct a grouping of battery cells 66, sometimes referred to as a "cell stack" or "cell array." In an embodiment, the battery cells 66 are prismatic, lithium-ion cells. However, battery cells having other geometries (cylindrical, pouch, etc.), other chemistries (nickel-metal hydride, lead-acid, etc.), or both could alternatively be utilized within the scope of this disclosure. The battery cells 66, along with any support structures (e.g., array frames, spacers, rails, walls, plates, bindings, etc.), may collectively be referred to as a battery assembly or battery array 25. The battery pack 24 depicted in FIGS. 5A and 5B includes a single battery array 25; however, the battery pack 24 could include a greater number of battery arrays and still fall within the scope of this disclosure.

The battery pack 24 may additionally house one or more battery electronic components 68. The battery electronic component 68 could include a bussed electrical center (BEC), a battery electric control module, wiring harnesses, wiring loops, I/O connectors etc., or any combination of these battery electronic components.

An enclosure assembly 70 (see FIG. 5A) may house each battery array 25 and each battery electronic component 68 of the battery pack 24. Since the battery array 25 and the battery electronic component 68 are housed inside the enclosure assembly 70, these components are considered battery internal components of the battery pack 24. The enclosure assembly 70 has been removed from FIG. 5B to better illustrate the battery internal components.

In an embodiment, the enclosure assembly 70 is a sealed enclosure that includes a tray 72 and a cover 74. The enclosure assembly 70 may include any size, shape, and configuration within the scope of this disclosure.

In another embodiment, the enclosure assembly 70 is a polymer-based component. For example, the tray 72 and the cover 74 could be constructed (e.g., molded) of expanded polymer-based materials, solid polymer-based materials, or a combination of such materials. Exemplary expanded polymer-based materials can include, but are not limited to, expanded polypropylene, expanded polystyrene, and expanded polyethylene. Exemplary solid polymer-based materials can include, but are not limited to, sheet moulding compounds (e.g., glass-fiber reinforced polyester), polypropylene, and polyamine.

In another embodiment, the enclosure assembly 70 may include metallic-based components. For example, portions of the tray 72 and the cover 74 could be constructed out of aluminum or steel.

The battery pack 24 may additionally include the structural brace 64. The structural brace 64 may be located outside of the enclosure assembly 70 and is therefore a separate and distinct component from the enclosure assembly 70. In an embodiment, a floor 76 of the tray 72 separates the battery internal components from direct contact with the structural brace 64 (see, e.g., FIG. 5A).

The structural brace 64 may be a rigid, metallic structure. In an embodiment, the structural brace 64 is made of steel. However, other relatively rigid materials are also contemplated within the scope of this disclosure.

In an embodiment, the battery array 25, the battery electronic component 68, or both are mechanically coupled to the structural brace 64 but are mechanically decoupled from the enclosure assembly 70. In this disclosure, the term "mechanically coupled" means fixedly connected, whereas the term "mechanically decoupled" denotes an absence of any fixed connection such that the structural brace 64 substantially absorbs any momentum during an impact event rather than the enclosure assembly 70 or any battery electronic component 68 housed inside the enclosure assembly 70.

The battery array(s) 25 and the battery electronic component(s) 68 may be mechanically coupled to the structural brace 64 using one or more fasteners 78A, 78B, respectively. In an embodiment, the fasteners 78A, 78B are relatively rigid bolts or screws. Other rigid fasteners could also be used within the scope of this disclosure. The fasteners 78A, 78B provide high strength connectors for holding the battery array(s) 25 and the battery electronic component(s) 68, respectively, in place.

The fasteners 78A, 78B may be connected to the battery array(s) 25 and the battery electronic component(s) 68 in any known manner In an embodiment, the fasteners 78A extend vertically through the battery array(s) 25, and the fasteners 78B extend vertically through the battery electronic component(s) 68. The fasteners 78A may be larger than the fasteners 78B, in an embodiment.

The fasteners 78A, 78B may each pass through openings formed in the enclosure assembly 70, but neither the fasteners 78A, 78B nor the enclosure assembly 70 applies any fixation forces against the other in order to mechanically decouple the battery array(s) 25 and the battery electronic component(s) 68 relative to the enclosure assembly 70.

The structural brace 64 may include receiving components 80 that are configured to fixedly accept the fasteners 78A, 78B. In an embodiment, the receiving components 80 include receiving nuts or dowels that can be embedded within a surface of the structural brace 64. In another embodiment, the receiving components 80 include threaded openings formed in the structural brace 64.

The enclosure assembly 70 may also be mechanically coupled to the structural brace 64. The enclosure assembly 70 may be mechanically coupled to the structural brace 64 using one or more additional fasteners 82. The structural brace 64 may include additional receiving components 84 that are configured to fixedly accept the fasteners 82 (see FIG. 5A). In an embodiment, the fasteners 82 are bolts or screws and the receiving components 84 are nuts, dowels, or threaded openings.

During a vehicle impact event, impact forces can be dissipated directly from the battery internal components (e.g., the battery array(s) 25 and the battery electronic component(s) 68) to the structural brace 64, thereby mechanically bypassing the enclosure assembly 70. The structural brace 64 may accept and transfer these impact loads to the vehicle body structure 58 (see FIGS. 2-4). The structural brace 64 therefore enables the use of low cost and low weight polymers for housing the battery internal components without sacrificing impact protection for these relatively sensitive battery internal components.

The structural brace 64 of the battery pack 24 of FIGS. 5A and 5B includes a single-piece mounting plate design. However, other structural brace designs are also contemplated within the scope of this disclosure.

Figure 6:
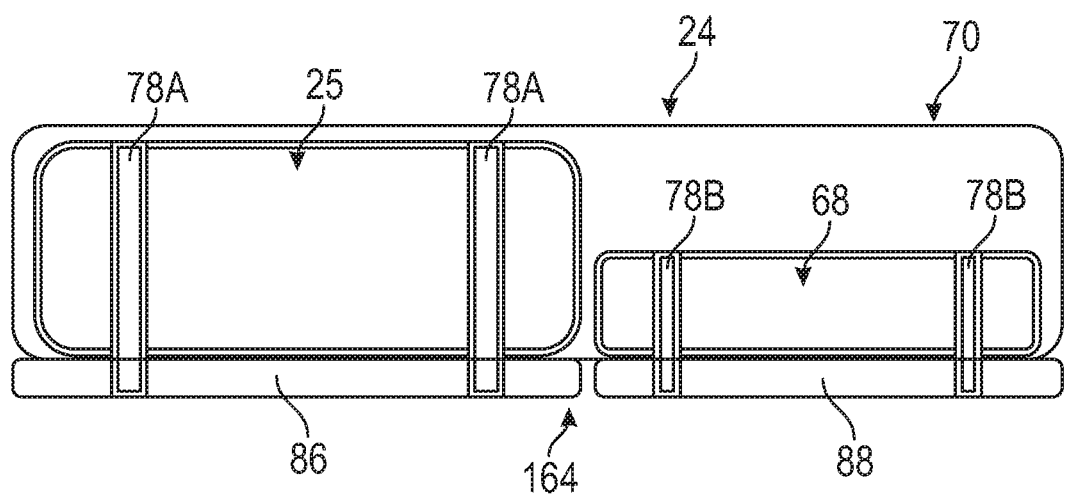
FIG. 6 illustrates a battery pack that includes a structural brace according to a second embodiment of this disclosure.

Referring to FIG. 6, for example, a structural brace 164 of the battery pack 24 may include a two-piece design having a first mounting plate 86 and a second mounting plate 88 that is separate from the first mounting plate 86. The battery array(s) 25 may be mechanically coupled to the first mounting plate 86 using the fasteners 78A, and the battery electronic components 68 may be mechanically coupled to the second mounting plate 88 using the fasteners 78B. In this design, the battery array(s) 25 and the battery electronic component(s) 68 are each mechanically decoupled from the enclosure assembly 70.

Figure 7:
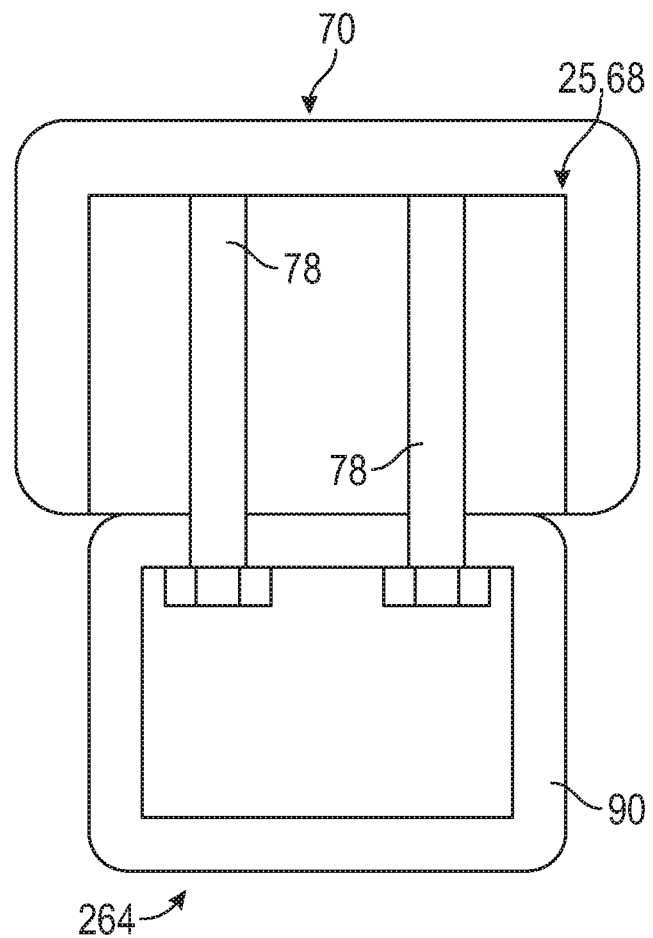
FIG. 7 illustrates a battery pack that includes a structural brace according to a third embodiment of this disclosure.

Referring to FIG. 7, a structural brace 264 of the battery pack 24 may include a tubular member 90. The battery array(s) 25 and/or the battery electronic component(s) 68 may be mechanically coupled to the tubular member 90 by the fasteners 78. In this design, the battery array(s) 25 and the battery electronic component(s) 68 are each mechanically decoupled from the enclosure assembly 70.

The exemplary battery packs of this disclosure incorporate rigid structural braces that enable the mechanical decoupling of the relatively sensitive battery internal components from the pack outer enclosure assembly, thereby enabling cost and weight reductions through the use of polymer-based enclosures for housing the battery internal components without sacrificing impact protection. The structural braces may also enable the use of a common battery pack design across multiple vehicle platforms. Among various additional benefits, the proposed battery packs may improve packaging efficiencies and provide cost and weight reductions as compared to existing battery pack designs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    an enclosure assembly;
    a battery internal component inside the enclosure assembly; and
    a structural brace outside the enclosure assembly,
    wherein the battery internal component is fixedly connected to the structural brace but is not fixedly connected to the enclosure assembly.

2. The battery pack as recited in claim 1, wherein the enclosure assembly is a polymer-based component.

3. The battery pack as recited in claim 2, wherein the enclosure assembly includes a tray and a cover.

4. The battery pack as recited in claim 1, wherein the battery internal component includes a battery array.

5. The battery pack as recited in claim 1, wherein the battery internal component includes a battery electronic component.

6. The battery pack as recited in claim 1, wherein the battery internal component includes each of a battery array and a battery electronic component.

7. The battery pack as recited in claim 1, wherein the battery internal component is fixedly connected to the structural brace by at least one fastener.

8. The battery pack as recited in claim 7, wherein the at least one fastener is a bolt or a screw.

9. The battery pack as recited in claim 7, wherein the structural brace includes a receiving component configured to fixedly accept the at least one fastener.

10. The battery pack as recited in claim 9, wherein the receiving component is a nut, a dowel, or a threaded opening.

11. The battery pack as recited in claim 1, wherein the structural brace is a single piece metallic mounting plate.

12. The battery pack as recited in claim 1, wherein the structural brace includes a first mounting plate and a second mounting plate that is separate from the first mounting plate.

13. The battery pack as recited in claim 12, wherein the battery internal component includes a battery array mounted to the first mounting plate and a battery electronic component mounted to the second mounting plate.

14. The battery pack as recited in claim 1, wherein the structural brace includes a metallic tubular member.

15. The battery pack as recited in claim 1, wherein the enclosure assembly includes a tray, and a floor of the tray extends between the battery internal component and the structural brace.

16. An electrified vehicle, comprising:
    a vehicle body structure; and
    a battery pack mounted to the vehicle body structure and including an enclosure assembly, a battery internal structure inside the enclosure assembly, and a structural brace outside of the enclosure assembly,
    wherein the battery internal structure is mounted to the structural brace but not to the enclosure assembly.

17. The electrified vehicle as recited in claim 16, wherein the vehicle body structure is a floor pan.

18. The electrified vehicle as recited in claim 17, wherein the battery pack is mounted above the floor pan.

19. The electrified vehicle as recited in claim 17, wherein the battery pack is mounted below the floor pan.

20. The electrified vehicle as recited in claim 16, wherein the battery internal structure is a battery array, a battery electronic component, or both.

\* \* \* \* \*